United States Patent [19]

Hungerford

[11] 4,432,917
[45] Feb. 21, 1984

[54] METHOD FOR IMPROVING THICKNESS UNIFORMITY OF STRETCH ORIENTED POLYACRYLONITRILE FILM

[75] Inventor: Gordon P. Hungerford, Palmyra, N.Y.

[73] Assignee: Mobil Oil Corporation, New York, N.Y.

[21] Appl. No.: 322,359

[22] Filed: Nov. 18, 1981

[51] Int. Cl.³ .............................................. B29D 7/24
[52] U.S. Cl. .................................. 264/40.1; 264/182; 264/210.5; 264/216; 264/289.6; 264/290.2
[58] Field of Search ................ 264/40.1, 289.3, 289.6, 264/290.2, 182, 206, 216, 210.5, 210.6, 210.7

[56] References Cited

U.S. PATENT DOCUMENTS 2,627,088 2/1953 Alles et al. .
2,995,779 8/1961 Winter .
3,161,711 12/1964 Tassler .
3,257,489 6/1966 Heffelfinger .
3,275,612 9/1966 Bechtold ............................. 260/88.7
3,404,205 10/1968 Ballard et al. ..................... 264/290.2
3,437,717 4/1969 Isley et al. ........................... 260/881
3,576,658 4/1971 Notomi et al. .
3,652,759 3/1972 Schlemmer et al. .
4,144,299 3/1979 Inoue et al. ......................... 264/558
4,224,097 9/1980 Talsma et al. .................... 156/307.3

FOREIGN PATENT DOCUMENTS 2542507 3/1977 Fed. Rep. of Germany ... 264/290.2

Primary Examiner—James B. Lowe
Attorney, Agent, or Firm—Alexander J. McKillop; James F. Powers, Jr.; James P. O'Sullivan, Sr.

[57] ABSTRACT

A system for producing a biaxially oriented polymer film of predetermined gauge profile. Methods and apparatus are provided for forming a continuous film of the polymer having substantially uniform gauge by controlling the character of the film in its aquagel form prior to transverse stretching.

10 Claims, 2 Drawing Figures

METHOD FOR IMPROVING THICKNESS UNIFORMITY OF STRETCH ORIENTED POLYACRYLONITRILE FILM

This invention relates to a process and apparatus for improving thickness uniformity of polymeric acrylonitrile. More particularly, the invention relates to a process and apparatus adaptable to continuous operation for improving the thickness uniformity of polyacrylonitrile films.

Polyacrylonitrile has been known and available since the late 1940's. This polymer cannot be melted without decomposing and therefore films cannot be made by conventional hot melt extrusion techniques. A successful technique for forming polyacrylonitrile films is described in U.S. Pat. No. 4,066,731 which is incorporated herein by reference. Basically the process involves (a) forming a concentrated solution of an acrylonitrile polymer in a solvent therefor that is water soluble, (b) applying the solution to a film supporting cool surface, (c) contacting the resultant film with an aqueous medium to substantially remove and replace with water the solvent in the film, and (d) recovering as the resultant film a biaxially orientable film which consists essentially of a polyacrylonitrile aquagel containing from about 20 to about 75 percent by weight water.

With this type of biaxially orientable film, difficulty has always been experienced in obtaining a film of uniform gauge across the width. Typically, the transverse thickness profile is somewhat U-shaped, with the center region being fairly uniform, but with the outermost portions a few inches inboard from the edges having a thickness perhaps 25% higher than that in the central region.

It is an object of the present invention to provide an improved process for oriented polyacrylonitrile films. A further object is to provide an improved process for making oriented films of polymeric acrylonitrile having a minimum of gauge variation in the transverse direction.

A still further object is to provide a simple, economical process for the preparation of biaxially oriented polymeric acrylonitrile film which is characterized by a uniform gauge contour in the transverse direction. Yet another object is to provide apparatus for these processes. These and other objects will appear hereinafter.

These and other objects are accomplished by the present invention which comprises:

a process for orienting an aquagel film strip of acrylonitrile polymer in the machine direction by hot stretching film between differential speed rolls;

treating the film strip so as to alter the character of the aquagel across the width of the strip so as to result in predetermined regions tending to resist transverse orientation and permit stretching to a comparatively uniform film thickness; and transversely stretching the treated aquagel film having said altered aquagel character by transverse direction hot stretching of the strip to yield a film of comparatively uniform thickness. Such a process and apparatus therefor will be described in detail hereinafter, reference being had to the accompanying drawings, wherein.

The film feedstock for the present invention can be derived from continuous film casting or from extruding equipment. Flat film may be solvent cast according to the process of U.S. Pat. No. 4,066,731 wherein acrylonitrile homopolymer or interpolymer is cast onto a rotating drum from a sheeting die and coagulated as a self-supporting film. Organic solvent for the polyacrylonitrile, such as dimethylsulfoxide, can be replaced by washing with a water bath to obtain an aquagel film containing up to 75% water. This water is integrally bound in the molecular interstices of the polymer or dispersed in the orientable polymeric matrix. A tubular polyacrylonitrile (PAN) film can be extruded and water coagulated, if necessary, according to the teachings of U.S. Pat. No. 4,144,299, and the unoriented film can be slit and fed to the orientation units as a flat strip. Aqueous PAN film can also be made by extrusion of a high temperature polymer hydrate in a known manner.

Acrylonitrile polymers containing at least 5% $H_2O$, preferably aquagels containing about 40 to 60% $H_2O$, are contemplated herein. The present system is especially valuable for treating non-thermoplastic PAN homopolymer, such as duPont type A resin.

Figure 1:
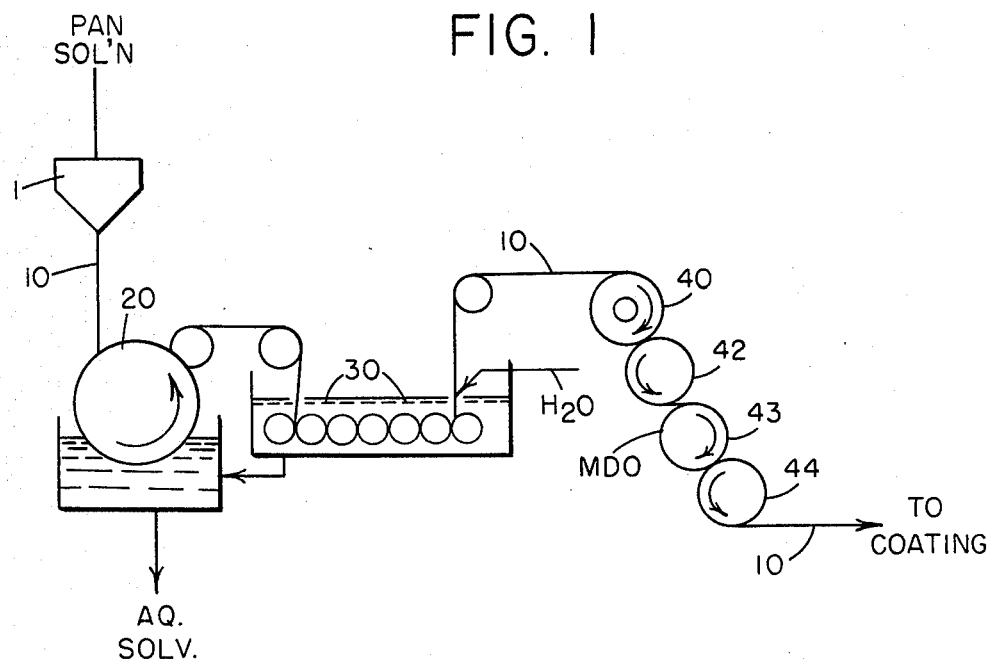
FIG. 1 is a schematic representation, in side view, of a system for producing the subject aquagel.

Referring to FIG. 1, a continuous production line is shown for manufacturing PAN aquagel film. For instance, hot polyacrylonitrile-dimethylsulfoxide solution is fed, under pressure, to sheeting die 1, which extrudes a thin film of polymer solution onto cold drum surface 20. After contacting an aqueous medium, the self-supporting aquagel film is stripped from drum 20 and traverses a counter-current aqueous bath 30 wherein the organic solvent is removed and replaced by water, thereby forming the aquagel. The film 10 passes through the machine direction orienter (MDO) 40 comprising a first heated roll maintained at about 75° C. and thereafter a series of orienting rolls 42, 43, and 44, which are maintained at a sufficient differential speed to longitudinally stretch the web about 2 to 3 times thereby providing a uniaxially oriented aquagel film. The faster rolls are kept at about 50° C. Thereafter, the film is transferred to the subsequent treatment sections shown in FIG. 2.

Figure 2:
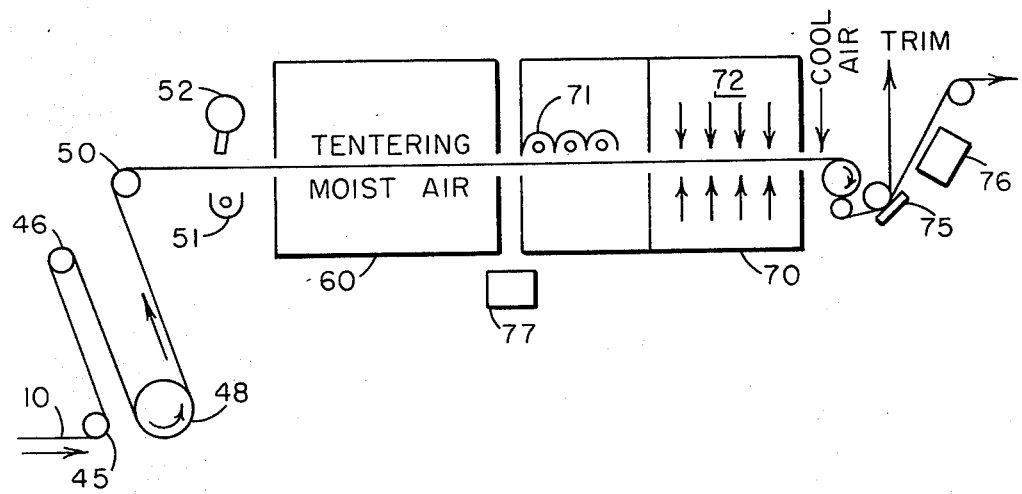
FIG. 2 is a schematic side view of a system for controlling the water content of the aquagel film strip prior to transverse orientation, effecting the transverse orientation and the subsequent drying of the film.

Referring to FIG. 2, the uniaxially oriented aquagel film 10 is passed over a series of rolls 45, 46 and 48 which provide adequate tension prior to entering tentering unit 60. Roller guide 50 positions the uniaxially oriented film for treatment prior to entering the tentering unit 60.

Prior to entering tentering unit 60, the film receives energy from a heating source 51 which is positioned to direct its heat to a central, longitudinal region of the film. This heating means can be a hot-air gun or a radiant heater. The object is to have a drying means capable of directing energy to any defined longitudinal region of the moving web. While FIG. 2 shows heating means 51 on only one side of the web, it is to be understood that the heating means could be on the other side of the web or on both sides of the web. Also located before the entry point of the tentering unit is a water application means 52 designed preferably to apply water to narrow longitudinal regions adjacent to the outer edges of the moving aquagel film. The water application means 52 is designed to operate independently of, or in combination with, heating means 51. As with the heating means, it is to be understood that water application means 52 can be located on the opposite side of the film shown or on both sides of the film.

As the film progresses from the point of selective drying and or selective wetting, it passes through a transverse direction orientation (TDO) unit 60.

The transverse direction orientation step is usually effected by attaching edge clips to the film progressively and stretching the film perpendicular to its machine direction travel. In so doing, the edge portions in the clips become damaged and, in any event, are thicker than the adjoining film and are ordinarily trimmed from the finished product. In the TDO unit, the film is preferably contacted with moist, hot gas, e.g. air, to prevent excessive water loss. Means for impinging hot, water-saturated air or the like at high velocity can be provided in a standard tentering apparatus, such as that disclosed in U.S. Pat. No. 3,611,479. TD stretch ratios of 2:1 to 4:1 or higher may be employed, with 3:1 being employed for typical PAN aquagel film.

The biaxially-oriented film is dried under constraint to remove water and other volatile materials which may be present in the film. These other materials may be residual organic solvent or monomer, from the film casting operation, or excess plasticizing agent.

As the film passes through the drier unit 70, it receives energy from a bank of radiant heaters 71 and thereafter is completely dried in oven section 72 where hot air, at about 200° C. is directed towards the film at high velocity. Thereafter the film is reduced to handling temperature by a stream of cool air at the exit end of drier 70 and trimmed by two edge slitting blades 75 to remove unstretched edge portions. The biaxially oriented film may then be wound onto a spool for storage or further processed by additional steps or taken directly to a fabrication line.

While not shown in the system illustrated in FIGS. 1 and 2 it is to be understood that at a point after machine direction orientation the aquagel film can be directed into a dip tank containing water soluble materials calculated to enhance the physical characteristics of the final film. Such a dip tank, for example, could contain an aqueous bath of triethylene glycol in order to take advantage of the plasticizing affect of the glycol on the PAN. When such a dip tank is employed, the heating means 51 may be positioned either at a point where the film enters the dip tank or, as shown in FIG. 2, at a point adjacent to the entrance to the tentering unit. It will become clear below why the location of the heater can be either before or after such a dip tank.

An apparatus for monitoring the gauge thickness can be positioned at an appropriate point in the system, for example at any convenient location beyond drier unit 70. Such a device can be, for example, a beta ray thickness gauge 76, shown in FIG. 2 located at a point after edge slitters 75. A control unit 77 can be operatively responsive to measuring device 76. As the measuring device senses deviations from a predetermined thickness profile specification control unit 77 causes operation of either heating unit 51 and/or water applicator unit 52 to permit a change in aquagel character so that dimensions will return to within predetermined specifications.

The uniaxially oriented aquagel film is surprisingly sensitive to the selective drying and/or the selective wetting technique accomplished by means 51 or 52. For example, when drying means 51 is a resistance heater element equipped with a blowing means having an exit nozzle of 2 inch diameter and it is positioned within the center region of the 13-inch wide aquagel film and the hot air impinging on the film is within the temperature range of 100° to 600° C. and this unit is located approximately 18 inches before the entrance to the tentering unit and the linear speed of the aquagel film is approximately 30 feet per minute, it will be noted by monitoring the gauge profile readout of gauge measurement means 76 that there is an immediate change in the profile of the film. The profile becomes significantly more uniform, than it would be in the absence of such a treatment.

While this is not completely understood, and it is somewhat unexpected because of the close proximity of the drying means to the entrance point of the tentering unit, it is believed that even a comparatively slight alteration in the character of the aquagel in the center region of the film introduces resistance to stretching in this broad central region. The result is, the outboard regions of the film, which tended to remain thicker than the center, now respond to the tentering forces so as to approach a gauge equal to the center of the aquagel film. Even in cases where the drying means 51 has been positioned at a point between roll 44 of FIG. 1 and roll 45 of FIG. 2, and between roll 44 and a dip tank utilized to introduce modifying materials, e.g., a plasticizing agent, such as triethylene glycol (a similar arrangement is shown in applicant's U.S. Pat. No. 4,391,939) a moderate amount of drying in the central region of the aquagel film is still effective in overcoming the tendency of the outboard regions of the aquagel film to be nonuniform. Again this is somewhat unexpected because the heating unit in this instance is placed at a point prior to the aquagel film entering an aqueous solution of a plasticizing agent. It would have been expected that any alteration in the aquagel system in the center of the film by the heating device, e.g. minor loss of water, would have been returned to its preheated state after entrance into an aqueous system. It was found, however, that the same stretch-resistance effect in the center region of the film was experienced during the tentering process so that the outboard regions of the film were permitted to respond to the tentering forces with the result being uniform thickness at the outboard regions of the aquagel film. In other words, it would have been thought that modest drying accomplished upstream of an aqueous dip tank might have been immediately reversed by immediate water re-absorption to equilibrium in the dip tank since the "dried" portions still contained considerable water, but such, evidently is not the case. While applicant does not intend to be bound by any theory, it is believed that as a result of the moderate heating, a partial "drying" must collapse, or partially collapse irreversibly the aquagel, thus reducing the reimbibition of water into the sheet in the central region as it passes through the dip tank. This would account for the greater resistance to stretching in the central region than in the balance in the sheet.

The following examples illustrate the effect of the application of an aqueous surface treatment and/or the effect of a heating treatment on the surface of the aquagel film in order to improve gauge uniformity of the finished film.

EXAMPLE 1

Polyacrylonitrile homopolymer aquagel film is made according to U.S. Pat. No. 4,066,731. This sheet weighs from about 140 mg/in$^2$ to about 250 mg/in$^2$ and contains about 45–50% water. It is longitudinally stretched two times on a machine direction orienter with a first heated roll (75° C.) and cooler speed differential rolls (50° C.) The uniaxially oriented wet film approaches the tentering apparatus at a linear speed of about 9 meters per minute with a width of 13 inches. The dried biaxially oriented film emerging from drier unit 70 is approximately 40 inches wide. The measuring device, for example, a beta ray thickness gauge, shows that the central 24 inches of the film is comparatively uniform with the two outboard 8 inches increasing from 0 to 0.2 mils greater than the center region. While monitoring the gauge profile of the film, water application device was activated so as to apply a constant drip of water approximately one inch wide on both sides of the outboard regions of the aquagel film adjacent to the tentering clips. It was observed subsequently that this one inch region became approximately 3 inches wide after transverse stretching. The point of application of the water was approximately 18 inches in advance of the entrance to the tentering unit. In spite of the close proximity of the application of the water to the tentering apparatus, the outboard regions of the dried film were observed to substantially approach the gauge of the central region of the finished film.

It appears that the more water that is applied the more plasticized becomes the sheet in this region and the more it thins down during stretching in the region where the water is applied. The water evidently diffuses very rapidly into the sheet since the sheet travels only about two feet before transverse stretching is begun.

EXAMPLE 2

The process of Example 1 is repeated except heater 51, a commercial "heat gun" (HEAT BLO-GUN, Model 1000×, 115 volt, 20 amp., 750°–1000° F. at 35 CFM, 2 inch diameter nozzle) positioned and adapted to apply a hot stream of air to the underside of the aquagel film at the center line is placed about 18 inches from the entrance to the tentering apparatus.

As in Example 1, prior to activation of heater unit 51, the beta ray thickness gauge indicated a somewhat U-shaped profile in the emerging dried film. It showed a variation from the center region to the outboard regions of approximately 0.25 mils. Heater unit 51 was activated and adjusted by monitoring the thickness gauge until the thickness gauge was substantially uniform across the entire width of the finished sheet.

As indicated above, the process of the present invention can be utilized to control the aquagel character across the width of the film strip either by subjecting a central region to a drying environment sufficient to alter the character of the aquagel in the center region so as to produce greater resistance in this region to transverse stretching or this can be accomplished by applying water or an aqueous solution to the outboard regions of the aquagel in order to increase the plasticization of these regions and thus, decrease resistance to stretching. In addition, both techniques can be carried out simultaneously or alternatively as required in automatic response to information provided by the measuring device monitoring the profile dimensions of the finished film. Appropriate control means can be interposed between the measuring device and the heating and aqueous solution application devices so as to cause them to respond when needed.

The term "aquagel" has been employed merely for purposes of illustration it being understood that this includes water, or water-containing solutions or indeed any other liquid that functions in the same manner as water in forming the PAN gel.

What is claimed is:

1. In a continuous process for producing oriented acrylonitrile polymer film by forming a polymer film strip from a hot solution of the polymer in a water soluble solvent, washing the polymer film with water or an aqueous solution to replace the solvent to form an aquagel film, stretching the aquagel film to orient the polymer and drying the oriented polymer film to remove water; the improvement comprising:

orienting the aquagel film strip by uniform machine direction hot stretching;

treating the aquagel film strip so as to alter the water content of the aquagel across the width of the strip so as to result in predetermined regions tending to resist transverse orientation and regions tending to permit stretching to a comparatively uniform film thickness; and transversely stretching the treated aquagel film strip having said altered aquagel water content by transverse direction hot stretching of the strip to yield a film of comparatively uniform thickness.

2. The process of claim 1 including treating the aquagel film strip prior to transversely stretching said strip to provide a relatively lower water content at a central longitudinal region of the strip and a relatively higher water content at outer longitudinal regions of the strip.

3. The process of claim 2 wherein said lower water content results from subjecting said central region to a drying environment sufficient to effect a water decrease in this region.

4. The process of claim 2 wherein said lower water content results from adding water to the outer longitudinal regions of said strip.

5. The process of claim 2 wherein said lower water content results from alternately subjecting said central region to a drying environment sufficient to effect a water decrease in this region and adding water to said outer regions.

6. The process of claim 2 wherein said lower water content results from at least substantially simultaneously subjecting said central region to a drying environment sufficient to effect a water decrease in this region and adding water in said outer regions.

7. A continuous process for producing biaxially oriented acrylonitrile polymer film of predetermined gauge profile comprising:

uniform machine direction orienting an aquagel film strip of said polymer;

transversely stretching the oriented aquagel film strip;

at least substantially removing water from said film strip;

continuously monitoring the gauge profile of the water-free film strip;

and in response to deviations from a predetermined gauge profile specification, treating the aquagel film strip prior to said transverse stretching to alter the water content of the aquagel across the width of the strip so as to result in predetermined regions tending to resist transverse stretching and regions tending to permit transverse stretching of said film to said predetermined gauge profile.

8. The process of claim 7 including, in response to said deviations, treating the aquagel film strip prior to transverse stretching to provide a relatively lower water content at specified longitudinal regions to cause comparative resistance to stretching and provide relatively higher water content at specified longitudinal regions to cause comparative accommodation to stretching.

9. The process of claim 8 wherein said treatment includes the substraction of water from and the addition of water to said specified regions.

10. The process of claim 8 wherein said treatment includes the substraction of water from or the addition of water to said specified regions.

* * * * *